US006404327B1

(12) United States Patent
Naddeo

(10) Patent No.: US 6,404,327 B1
(45) Date of Patent: Jun. 11, 2002

(54) ELECTRONIC LICENSE PLATE

(76) Inventor: Dean L. Naddeo, 305 Maple Ave., Oradell, NJ (US) 07649

( * ) Notice: Subject to any disclaimer, the term of this patent is extended or adjusted under 35 U.S.C. 154(b) by 0 days.

(21) Appl. No.: 09/772,364

(22) Filed: Jan. 30, 2001

Related U.S. Application Data

(60) Provisional application No. 60/191,851, filed on Mar. 24, 2000.

(51) Int. Cl.[7] ............................................... B60R 25/10
(52) U.S. Cl. ........................ 340/426; 340/468; 340/933; 359/529
(58) Field of Search ................................. 340/426, 468, 340/933, 539, 936; 359/529, 530, 533

(56) References Cited

U.S. PATENT DOCUMENTS

| | | | | | |
|---|---|---|---|---|---|
| 5,105,179 | A | * | 4/1992 | Smith | 340/468 |
| 5,276,728 | A | * | 1/1994 | Pagliaroli et al. | 455/404 |
| 5,621,571 | A | * | 4/1997 | Bantli et al. | 359/529 |
| 5,657,008 | A | * | 8/1997 | Bantli | 340/933 |
| 5,952,941 | A | * | 9/1999 | Mardirossian | 340/936 |
| 5,963,129 | A | * | 10/1999 | Warner | 340/468 |
| 6,124,783 | A | * | 9/2000 | Alexander | 340/426 |

* cited by examiner

*Primary Examiner*—John Tweel
(74) *Attorney, Agent, or Firm*—Goldstein & Lavas, P.C.

(57) ABSTRACT

An electronic license plate including a housing having a generally rectangular configuration. The housing is mountable to the license plate support of the vehicle and is powered by a vehicle power system. The housing has a front face comprised of a digital display. The digital display displays relevant license plate information of the vehicle. The information relates to a license plate number, a state of issue, and an expiration date. The housing includes a memory chip therein for storing the relevant license plate information thereon. The memory chip is in communication with a main computer system of a selected agency. License plate disabling mechanisms are in communication with the memory chip whereby removal of the housing from the vehicle will disable the memory chip and prevent future use of the electronic license plate. In addition, removal of the license plate disables the vehicle. Special status display mechanisms are in communication with the main computer system and with the memory chip whereby a report of theft entered into the main computer system will display such a status on the digital display.

3 Claims, 2 Drawing Sheets

ELECTRONIC LICENSE PLATE

CROSS REFERENCES AND RELATED SUBJECT MATTER

This application relates to subject matter contained in provisional patent application serial No. 60/191,851, filed in the United States Patent and Trademark Office on Mar. 24, 2000.

BACKGROUND OF THE INVENTION

The present invention relates to an electronic license plate and more particularly pertains to digitally displaying relevant information for a vehicle.

The use of vehicle license plate assemblies is known in the prior art. More specifically, vehicle license plate assemblies heretofore devised and utilized for the purpose of replacing conventional license plates are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,105,179 to Smith discloses an electronic replacement for a conventional license plate with means to display various plate information and includes anti-theft features and the ability to sense and adjust the display for ambient light conditions. U.S. Pat. No. 5,621,571 to Bantli discloses a digital display for use as an electronic license plate and incorporates bi-directional communications allowing for uses including electronic monitoring by law enforcement officials. U.S. Pat. No. 5,657,008 to Bantli discloses an electronic license plate with means to render the device inoperative and transmit an alarm signal in the event of tampering.

While these devices fulfill their respective, particular objective and requirements, the aforementioned patents do not describe an electronic license plate for digitally displaying relevant information for a vehicle.

In this respect, the electronic license plate according to the present invention substantially departs from the conventional concepts and designs of the prior art, and in doing so provides an apparatus primarily developed for the purpose of digitally displaying relevant information for a vehicle.

Therefore, it can be appreciated that there exists a continuing need for a new and improved electronic license plate which can be used for digitally displaying relevant information for a vehicle. In this regard, the present invention substantially fulfills this need.

SUMMARY OF THE INVENTION

In the view of the foregoing disadvantages inherent in the known types of vehicle license plate assemblies now present in the prior art, the present invention provides an improved electronic license plate. As such, the general purpose of the present invention, which will be described subsequently in greater detail, is to provide a new and improved electronic license plate which has all the advantages of the prior art and none of the disadvantages.

To attain this, the present invention essentially comprises a housing having a generally rectangular configuration. The housing is mountable to the license plate support of the vehicle and is powered by a vehicle power system. The housing has a front face comprised of a digital display. The digital display displays relevant license plate information of the vehicle. The information relates to a license plate number, a state of issue, and an expiration date. The housing includes a memory chip therein for storing the relevant license plate information thereon. The memory chip is in communication with a main computer system of a selected agency. License plate disabling mechanisms are in communication with the memory chip whereby removal of the housing from the vehicle will disable the memory chip and prevent future use of the electronic license plate. In addition, removal of the license plate disables the vehicle. Special status display mechanisms are in communication with the main computer system and with the memory chip whereby a report of theft entered into the main computer system will display such a status on the digital display.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electronic license plate which has all the advantages of the prior art vehicle license plate assemblies and none of the disadvantages.

It is another object of the present invention to provide a new and improved electronic license plate which may be easily and efficiently manufactured and marketed.

It is a further object of the present invention to provide a new and improved electronic license plate which is of durable and reliable construction.

An even further object of the present invention is to provide a new and improved electronic license plate which is susceptible of a low cost of manufacture with regard to both materials and labor, and which accordingly is then susceptible of low prices of sale to the consuming public, thereby making such an electronic license plate economically available to the buying public.

Even still another object of the present invention is to provide a new and improved electronic license plate for digitally displaying relevant information for a vehicle.

Lastly, it is an object of the present invention to provide a new and improved electronic license plate including a housing having a generally rectangular configuration. The housing is mountable to the license plate support of the vehicle and is powered by a vehicle power system. The housing has a front face comprised of a digital display. The digital display displays relevant license plate information of the vehicle. The information relates to a license plate number, a state of issue, and an expiration date. The housing includes a memory chip therein for storing the relevant license plate information thereon. The memory chip is in communication with a main computer system of a selected agency. License plate disabling mechanisms are in communication with the memory chip whereby removal of the housing from the vehicle will disable the memory chip and prevent future use of the electronic license plate. In addition, removal of the license plate disables the vehicle. Special status display mechanisms are in communication with the main computer system and with the memory chip whereby a report of theft entered into the main computer system will display such a status on the digital display.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
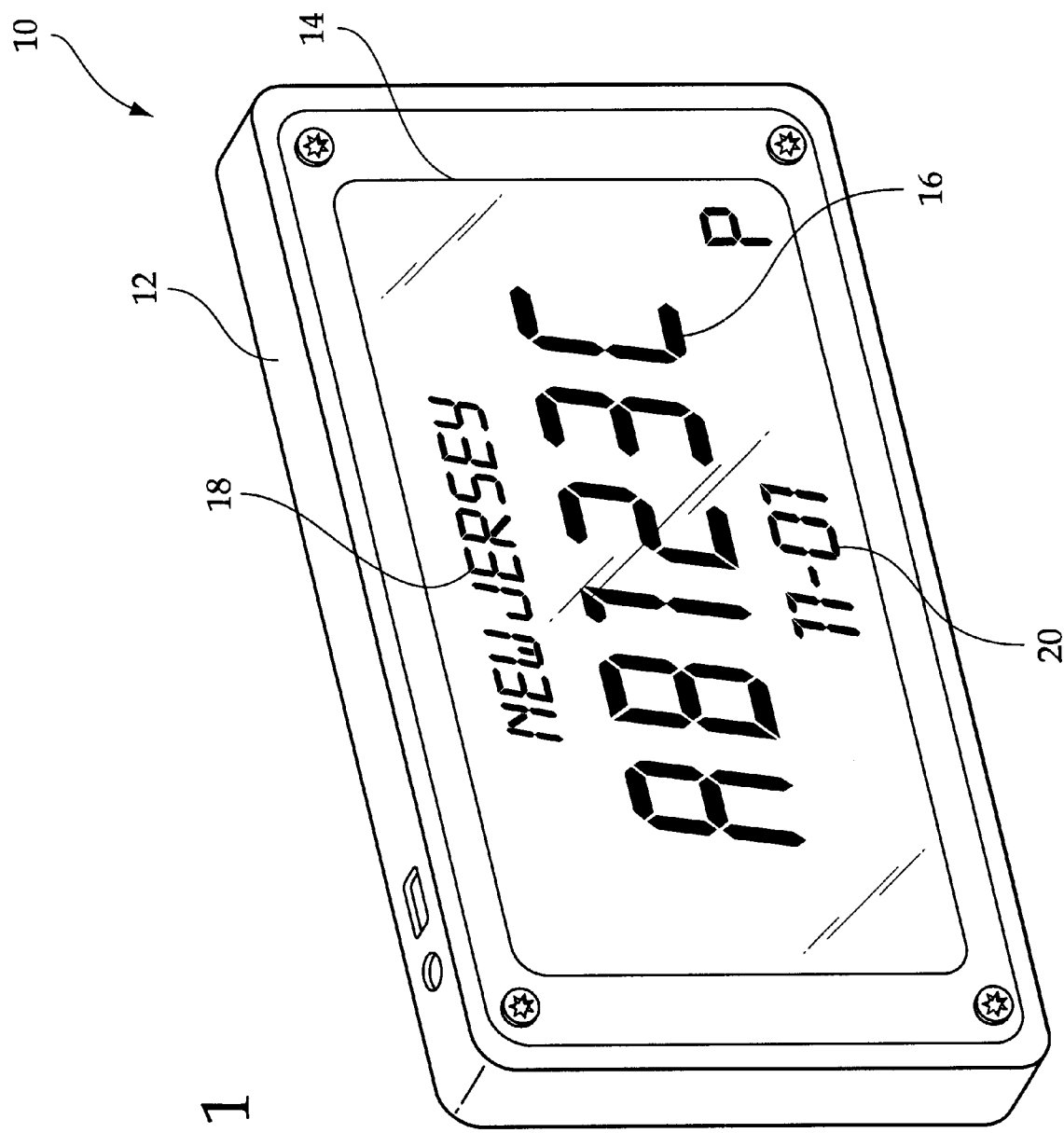
FIG. 1 is a perspective view of the preferred embodiment of the electronic license plate constructed in accordance with the principles of the present invention.
Figure 2:
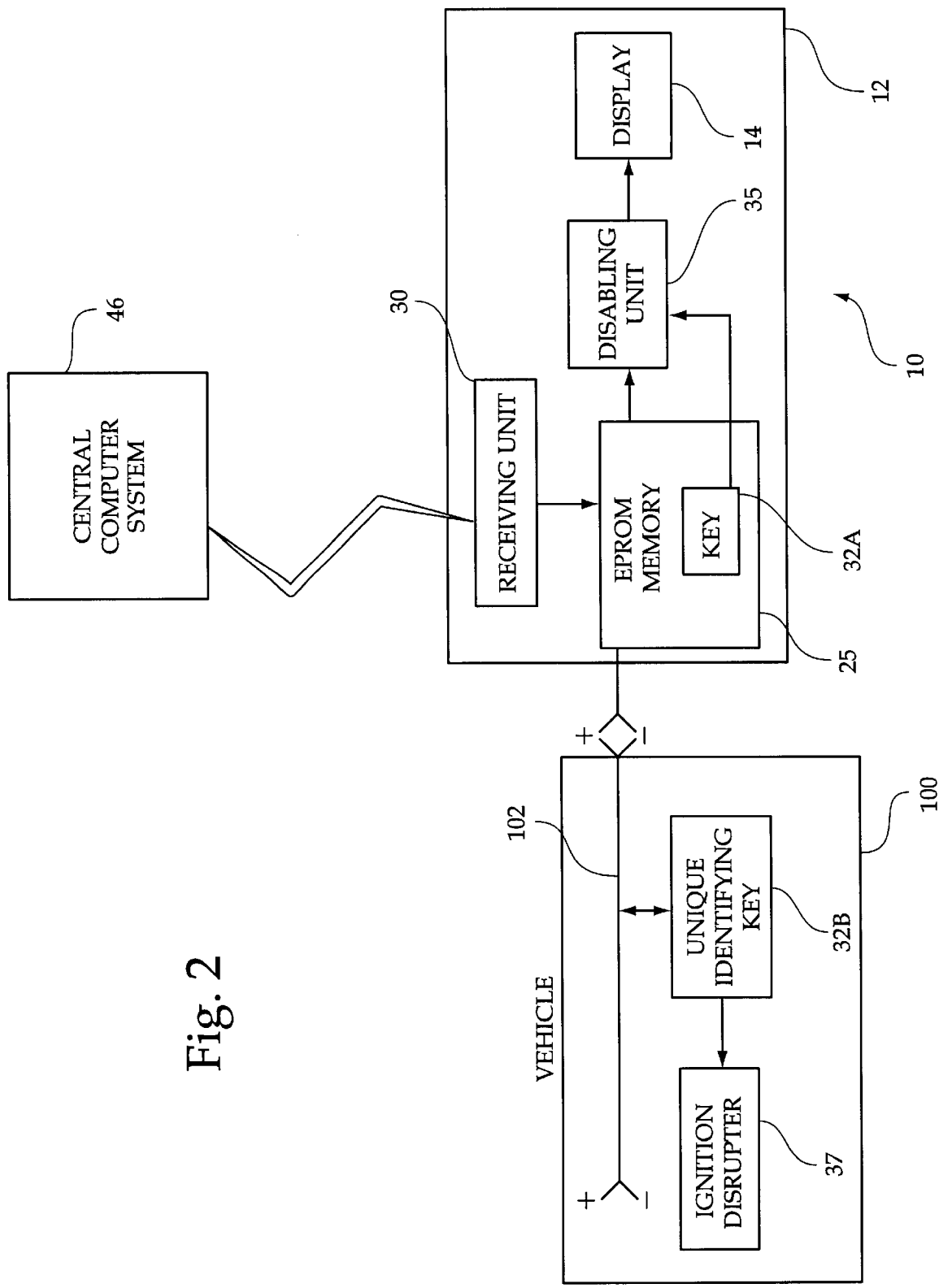
FIG. 2 is a block diagram, illustrating functional components of the electronic license plate system.

With reference now to the drawings, and in particular, to FIG. 1 and 2 thereof, the preferred embodiment of the new and improved electronic license plate embodying the principles and concepts of the present invention and generally designated by the reference number 10 will be described.

Specifically, it will be noted in the various Figures that the device relates to a electronic license plate for digitally displaying relevant information for a vehicle 100. In its broadest context, the device consists of a housing, disabling means, display means, receiving means, and anti-theft means. Such components are individually configured and correlated with respect to each other so as to attain the desired objective.

The housing 12 has a generally rectangular configuration. The housing 12 is mountable to the license plate support of the vehicle. Preferably, the housing 12 will be affixed to the vehicle by an authorizing motor vehicle agency only, by using a specially designed set of screws and tool. Alternatively, the housing 12 can be pre-installed by a manufacturer of a new vehicle. When used with newly manufactured vehicles, the license plate support on such vehicles will be of a different size and shape when compared with traditional "plates". Accordingly the housing 12 of the electronic license plate used with such a new vehicle is of a shape and size different from traditional license plates. Accordingly the substitution of the wrong type of license plate would be easily spotted by officials.

The housing has a front face which includes a digital display 14. The digital display 14 displays relevant license plate information of the vehicle. The information relates to a license plate number 16, a state of issue 18, inspection status (indicated herein with a "P" for pass), and an expiration date 20. The electronic license plate is connected to the vehicle 100, the vehicle 100 having a power system 102. Accordingly, the electronic license plate is powered by the vehicle. Accordingly, to preserve power, the digital display 14 illuminates more dimly when the vehicle is parked and not running. The housing 12 and the display 14 may be customized by an individual state or in accordance with color schemes, logos, and indicia desired by or uniquely associated by that state.

The housing 12 includes a memory unit 25 therein for storing the relevant license plate information thereon. The memory chip is preferably an EPROM, which may be programmed with the license plate information, but will retain the license plate information—even when power and optional backup power is removed. The memory unit 25 is powered by vehicle's electrical system 102.

In further accordance with the present invention, a receiving unit 30 is provided, to receive informational transmissions from a central computer governmental agency computer system 46, presumably at the Department of Motor Vehicles (DMV), or law enforcement agencies. The central computer includes a database which maintains information concerning vehicle registrations, including registration date, registration (plate) numbers, state of issue, expiration date, as well as special status data, such as "stolen", "felony", "suspended", and the like. In addition, common status data, such as inspection status, can be easily stored. The receiving unit is located within the housing, and may use any suitable wireless information communicating technology, including those used in pagers, wireless PDAs and wireless LANS. It would be appreciated by one of ordinary skill in the art that the manner in which a packet of data can be transmitted and received is well known. Accordingly, detailed description thereof is beyond the scope of the discussion herein. When appropriate, either periodically, or when necessary to update obsolete data, a packet of data is transmitted to one of the electronic license plates from the central computer system 46. The packet may include the license plate information, and any special status data. Accordingly, the packet is received by the receiving unit 30 of the electronic license plate, and is displayed, as appropriate. A port may also be provided wherein a wired connection can be made to reprogram the memory chip. Such a port could follow any configuration or protocol for data transmission, such as RS-232, USB, etc.

Display disabling means 35 are disposed within the housing 12. The disabling means 35 are in communication with the memory chip whereby unauthorized removal of the housing 12 from the vehicle will disable the display 14 with a disabling means 35, and prevent future use of the electronic license plate, unless reprogrammed by an authorized agency. In conjunction therewith, unique identifying keys may be provided in both the vehicle 32B and the electronic license plate 32A. In the case of the electronic license plate, the unique identifying key 32A may be incorporated within the memory chip. The respective keys 32A and 32B may communicate with each other through the vehicle power system 102, using conventional automotive telemetry techniques to ensure that the proper electronic license plate is connected to the proper vehicle, and that it remains connected. Accordingly, when the electronic license plate is disconnected from its associated vehicle, both the electronic license plate may be inhibited from displaying its previous license plate information, and the vehicle itself may be disabled from operating with an ignition disrupter 37. Further, attempting to connect the electronic license plate with a vehicle which has a different, non-corresponding identifying key, would result in an inoperable electronic license plate and an inoperable vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. An electronic license plate for digitally displaying relevant information for a vehicle, the vehicle having a license plate support, a power system, a unique identifying key, and an ignition disruptor connected to the unique identifying key, the electronic license plate comprising, in combination:

a housing having a generally rectangular configuration, the housing being mountable to the license plate support of the vehicle, the housing having a front face comprised of a digital display, the digital display displaying license plate information of the vehicle, the license plate information including a license plate number, a state of issue, and an expiration date, the housing including a memory chip therein for storing the relevant license plate information thereon, the memory chip selectively in communication with a main computer system of a governmental agency, the memory chip being powered through the power system of the vehicle;

disabling means disposed within the housing, the disabling means being in communication with the memory chip whereby removal of the housing from the vehicle will disable the memory chip and prevent future use;

special status display means disposed within the housing, the special status display means being in communication with the memory chip and the main computer system whereby a report of theft entered into the main computer system will display such a status on the digital display;

a receiving means, for receiving data packets from the main computer, and wherein a report of registration suspension entered into the main computer system will be transmitted to the electronic license plate, received by the receiving means, and displayed on the digital display; and wherein the electronic license plate has a unique identifying key, and wherein the digital display will only display the license plate information if the electronic license plate and the vehicle it is attached to have matching unique identifying keys, wherein if the electronic license plate connected to the vehicle does not have a matching unique identifying key, then the vehicle will be disabled by the ignition disrupter.

2. The electronic license plate as recited in claim 1, wherein a report of criminal activity entered into the main computer system will display such a status on the digital display.

3. The electronic license plate as recited in claim 1, wherein the display further includes an inspection status indicator, wherein an inspection status entered into the main computer is communicated with the electronic license plate and is displayed on the display unit.

* * * * *